US012658658B2

(12) United States Patent
Tao

(10) Patent No.: US 12,658,658 B2
(45) Date of Patent: Jun. 16, 2026

(54) ROTATABLE ELECTRICAL PLUG

(71) Applicant: Deals Realm LLC, Eastvale, CA (US)

(72) Inventor: Yuebo Tao, Eastvale, CA (US)

(73) Assignee: Deals Realm LLC, Eastvale, CA (US)

( * ) Notice: Subject to any disclaimer, the term of this patent is extended or adjusted under 35 U.S.C. 154(b) by 332 days.

(21) Appl. No.: 18/425,361

(22) Filed: Jan. 29, 2024

(65) Prior Publication Data

US 2024/0170899 A1 May 23, 2024

Related U.S. Application Data

(63) Continuation-in-part of application No. 18/139,188, filed on Apr. 25, 2023, now Pat. No. 11,901,685.

(30) Foreign Application Priority Data

Apr. 25, 2022 (CN) ........................ 202220962452.8

(51) Int. Cl.

*H01R 35/04* (2006.01)
*H01R 24/30* (2011.01)
*H01R 103/00* (2006.01)

(52) U.S. Cl.

CPC ............. *H01R 35/04* (2013.01); *H01R 24/30* (2013.01); *H01R 2103/00* (2013.01)

(58) Field of Classification Search

CPC .... H01R 35/04; H01R 24/30; H01R 2103/00; H01R 39/64

See application file for complete search history.

(56) References Cited

U.S. PATENT DOCUMENTS

| | | | | |
|---|---|---|---|---|
| 5,399,093 A * | 3/1995 | Schneider | H01R 24/28 | 439/21 |
| 7,063,558 B1 | 6/2006 | Chen | | |
| 7,074,060 B2 * | 7/2006 | Lee | H01R 13/71 | 439/140 |
| 7,182,615 B1 * | 2/2007 | Liu | H01R 24/22 | 439/263 |
| 7,566,223 B2 * | 7/2009 | Wadsworth | H01R 39/64 | 439/21 |

(Continued)

OTHER PUBLICATIONS

Non-Final Rejection dated Jun. 29, 2023 for U.S. Appl. No. 18/139,188 which is the parent application of the instant application.

*Primary Examiner* — Travis S Chambers
(74) *Attorney, Agent, or Firm* — ScienBiziP, P.C.

(57) ABSTRACT

The present disclosure provides a rotatable electrical plug, which includes: a non-rotating assembly configured for receiving and being coupled with power lines of the rotatable electrical plug, the non-rotating assembly comprising a substrate, and at least one non-rotating element; a rotating assembly being rotatable relative to the non-rotating assembly, the rotating assembly comprising at least two electrode terminals configured to electrically plug-in a power socket; and at least one rotating conductor connected to the at least one non-rotating element respectively, the at least one rotating conductor comprising a base and at least one arm obliquely extending from the base; and a fastening element mounted on the rotating assembly, the fastening element comprising a first notch opened in a side wall of the fastening member, wherein the at least one arm passes through the first notch to expose outside of the fastening member.

14 Claims, 19 Drawing Sheets

(56) References Cited

U.S. PATENT DOCUMENTS

| | | | | | |
|---|---|---|---|---|---|
| 7,914,292 | B2 | 3/2011 | Honda | | |
| 7,946,852 | B2 | 5/2011 | John | | |
| 8,123,528 | B2 | 2/2012 | Devlin et al. | | |
| 8,747,119 | B2 * | 6/2014 | Hsu | ........................ | H01R 39/64 439/13 |
| 8,876,541 | B1 * | 11/2014 | Wu | ........................ | H01R 27/00 439/173 |

* cited by examiner

100

102

ROTATABLE ELECTRICAL PLUG

RELATED APPLICATIONS

This application is a continuation-in-part (CIP) of U.S. patent application Ser. No. 18/139,188, filed on Apr. 25, 2023, now U.S. Pat. No. 11,901,685, entitled "ROTATABLE ELECTRICAL PLUG," invented by YUANGUI HU and YUEBO TAO.

TECHNICAL FIELD

The disclosure relates to the technical field of plugs, and in particular to a rotatable electrical plug.

BACKGROUND

Generally, most of electrical apparatus need to use a power plug to connect to electrical power, and the power plugs are fixedly connected with its power cord. Because the insertion holes of the socket each has a specified direction, when the space between the power plug and the socket fixed on the wall or floor is small, the power cord is prone to become twisted relative to the power plug, and it is not convenient to plug the power plug into the socket. In particularly some electrical apparatuses, such as vacuum cleaners, hair dryers, power tools, etc., the electrical apparatuses change positions during use, and the traditional power plugs, especially for connection portions of the power cords adjacent to the plugs have to withstand torsions in different directions, which may cause damages or breakages of the power cords, and therefore the power cords may be safety hazards to the electrical apparatuses. Some power plugs can rotate, but these power plugs usually have poor contact.

Therefore, there is a room for improvement in the art.

BRIEF DESCRIPTION OF DRAWINGS

Implementations of the present disclosure will now be described, by way of embodiment, with reference to the attached figures.

DETAILED DESCRIPTION

Figure 1:
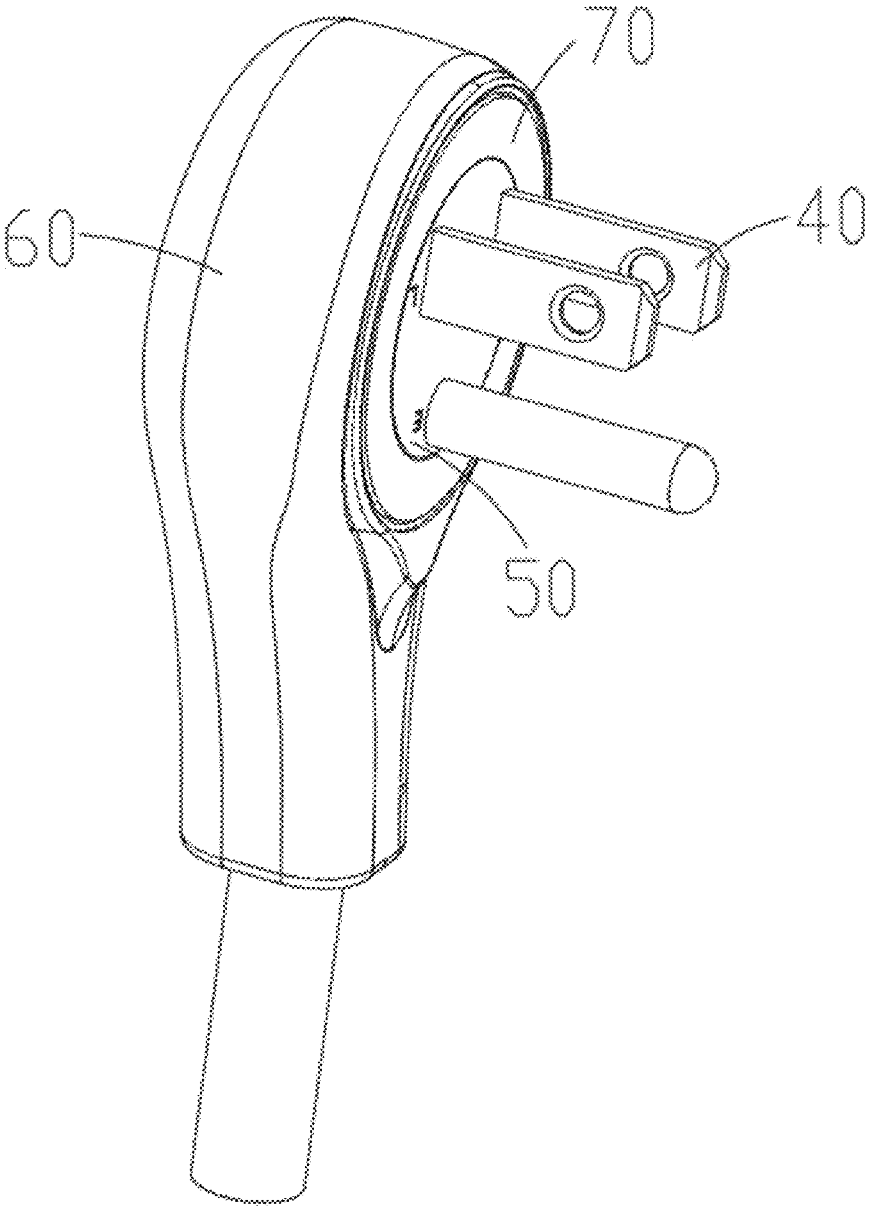
FIG. 1 is a schematic diagram of a first embodiment of a three-dimensional structure of a rotatable electrical plug according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to", specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references may mean "at least one".

First Embodiment

A rotatable electrical plug 100 according to a first embodiment of the present disclosure will be described below with reference to FIGS. 1 to 9.

Referring to FIGS. 1 to 9, the present disclosure provides the rotatable electrical plug 100, the rotatable electrical plug 100 comprises a non-rotating assembly 101, a rotating assembly 102, a housing 60 and a frame 70. The non-rotating assembly 101, the rotating assembly 102 and the frame 70 are received in the housing 60, and the rotating assembly 102 is rotatable 360 degrees relative to the non-rotating assembly 101 and the housing 60.

Figure 2:
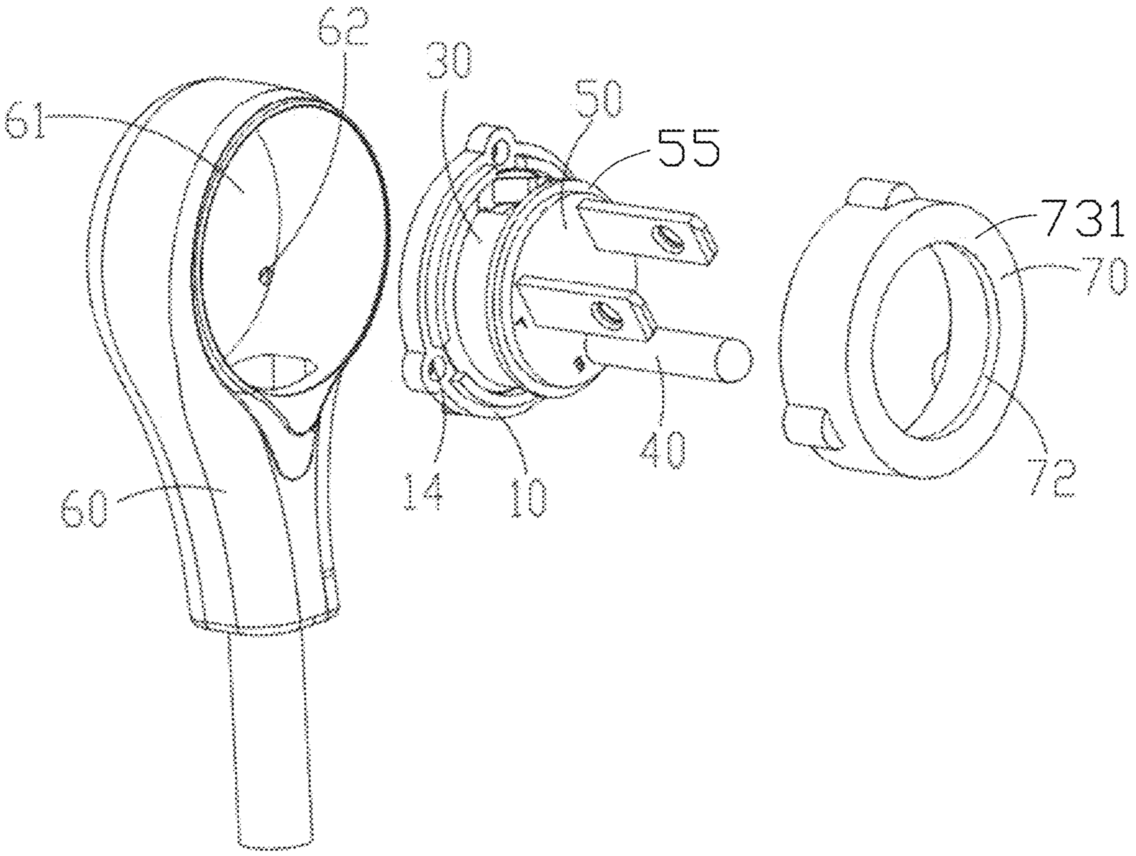
FIG. 2 is an exploded view of the rotatable electrical plug shown in FIG. 1.
Figure 3:
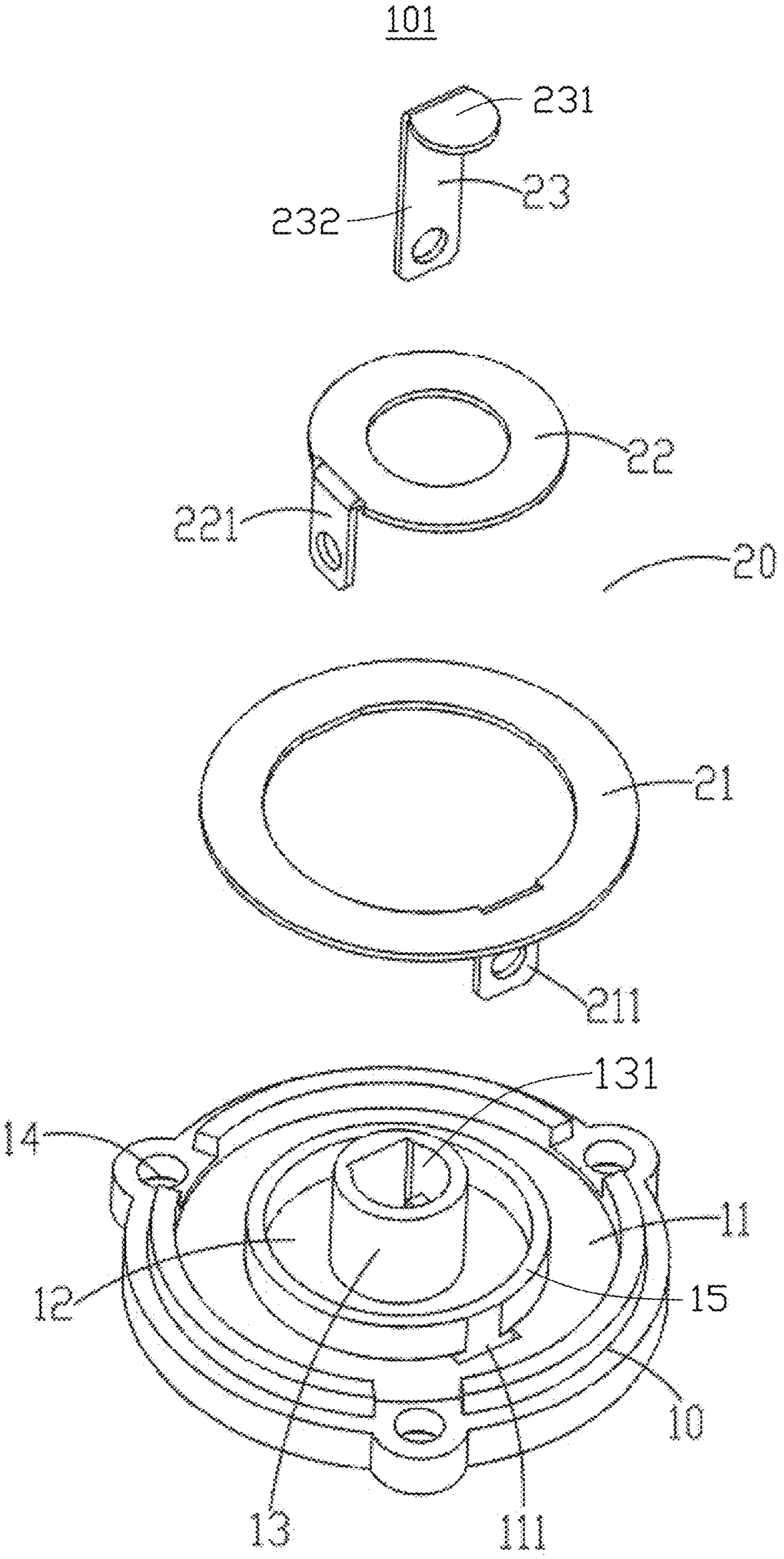
FIG. 3 is an exploded view of a non-rotating assembly of the present disclosure.

Referring to FIGS. 2 and 3, the non-rotating assembly 101 is configured for receiving and being coupled with power lines of the rotatable electrical plug 100, and comprises a substrate 10, and a conductor unit 20 located on the substrate 10.

The substrate 10 comprises a first groove 11, a second groove 12 and a third groove 131. The first groove 11 surrounds the second groove 12, and the second groove 12 surrounds the third groove 131.

In this embodiment, both the first groove 11 and the second groove 12 are circular in shape. A first circle defined by the first groove 11 and a second circled defined by the second groove 12 are concentric. The substrate 10 comprises a cylinder 13, the third groove 131 is defined on the cylinder 13 and located in a center of the circles defined by the first groove 11 and the second groove 12. In other embodiment, the first groove 11, the second groove 12 and the third groove 131 can be for example other ring shapes.

A spacer wall 15 is disposed between the first groove 11 and the second groove 12 and integrated with the substrate 10.

The conductor unit 20 comprises a first ring-shaped conductor (an example of non-rotating element) 21, a second ring-shaped conductor (an example of non-rotating element) 22, and a non-rotating conductor (an example of non-rotating element) 23. The first ring-shaped conductor 21, the second ring-shaped conductor 22 and the non-rotating conductor 23 are sequentially arranged at intervals and arranged on the substrate 10. The first ring-shape conductor 21, the second ring-shaped conductor 22 and the non-rotating conductor 23 are correspondingly arranged to the first groove 11, the second groove and third groove 131 respectively.

The first ring-shaped conductor 21 and the second ring-shaped conductor 22 are in concentric circles, and a diameter of the first ring-shaped conductor 21 is greater than a diameter of the second ring-shaped conductor 22, that is, the second ring-shaped conductor 22 is located an inner side of the first ring-shaped conductor 21. In this embodiment, the first ring-shaped conductor 21 and the second ring-shaped conductor 22 are coplanar. In addition, the first ring-shaped conductor 21 comprises a first fixing portion 211 configured to fix the first ring-shaped conductor 21 on the substrate 10, the second ring-shaped conductor 22 comprises a second fixing portion 221 configured to fix the second ring-shaped conductor 22 on the substrate 10.

The non-rotating conductor 23 is located on a center of the substrate 10 and surrounded by the first ring-shaped conductor 21 and the second ring-shaped conductor 22. The non-rotating conductor 23 comprises a sheet 231 and a third fixing portion 232 integrated with the sheet 231, the sheet 231 obliquely connects to the third fixing portion 232, and therefore, the sheet 231 is inclined and has a certain degree of elasticity.

In other embodiment, a part of the sheet 231 obliquely connects to the third fixing portion 232, there are no restrictions here.

Figure 8:
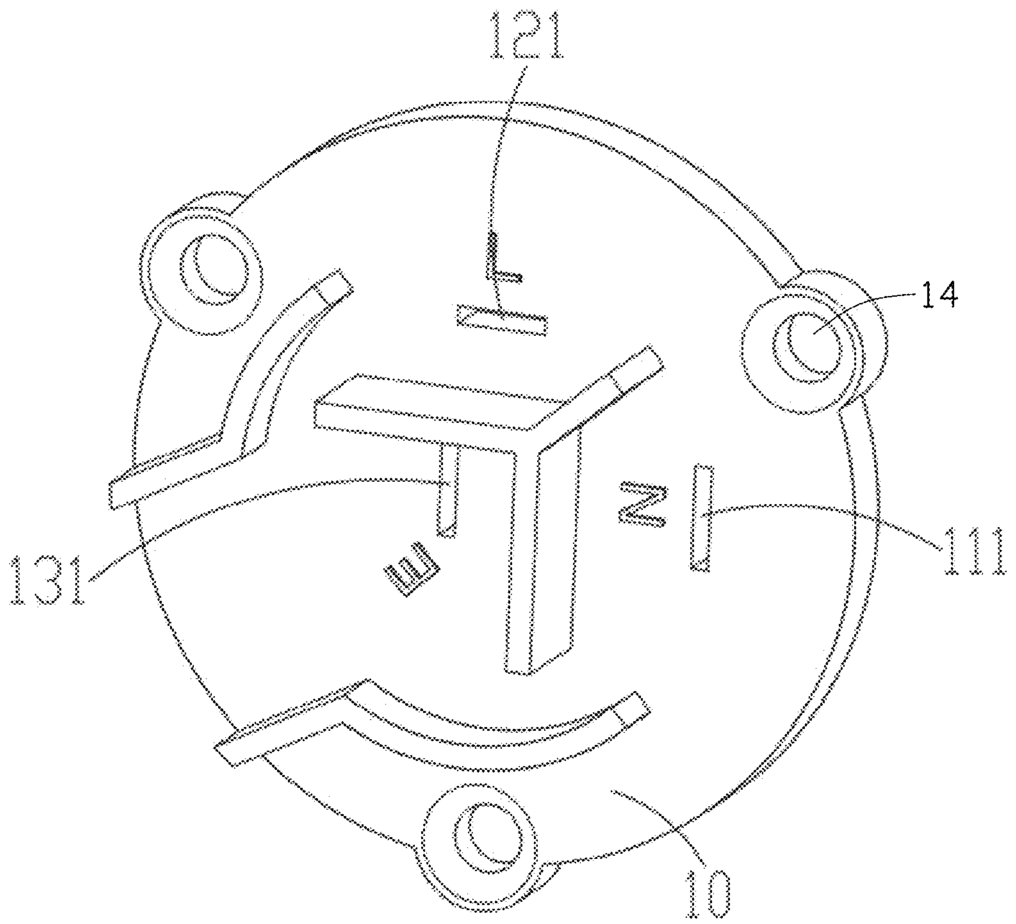
FIG. 8 is a schematic diagram of a substrate of the present disclosure.

The first groove 11 is configured for receiving the first ring-shaped conductor 21, the second groove 12 is configured for receiving the second ring-shaped conductor 22, and the third groove 131 is configured for receiving the third non-rotating conductor 23. Referring to FIGS. 2 and 8, a bottom of the first groove 11 defines a through hole 111, a bottom of the second groove 12 defines a second through hole 121, and a bottom of the third groove 131 defines a third through hole 131. The first fixing portion 211, the second fixing portion 221 and the third fixing portion 232 pass through the thickness of the substrate 10 via the corresponding first through 111, the second through hole 121 and the third through hole 131, and are connected to a corresponding power line.

In this embodiment, a length of the first fixing portion 211 and the second fixing portion 221 is greater than a length of the third fixing portion 232, and a height of the cylinder 13 is greater than a height of the spacer wall 15.

Figure 4:
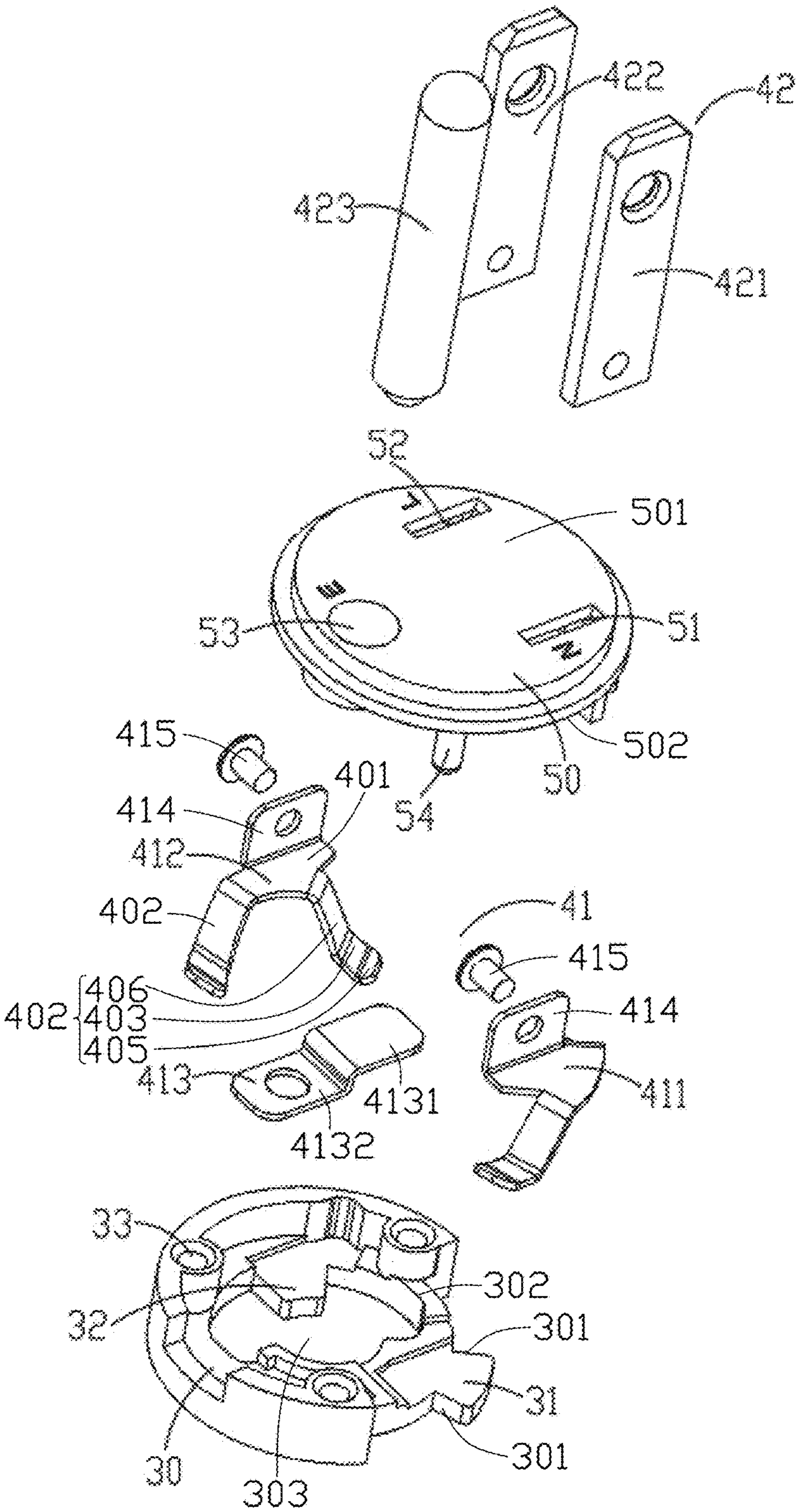
FIG. 4 is a first exploded view of a rotating assembly of the present disclosure.
Figure 5:
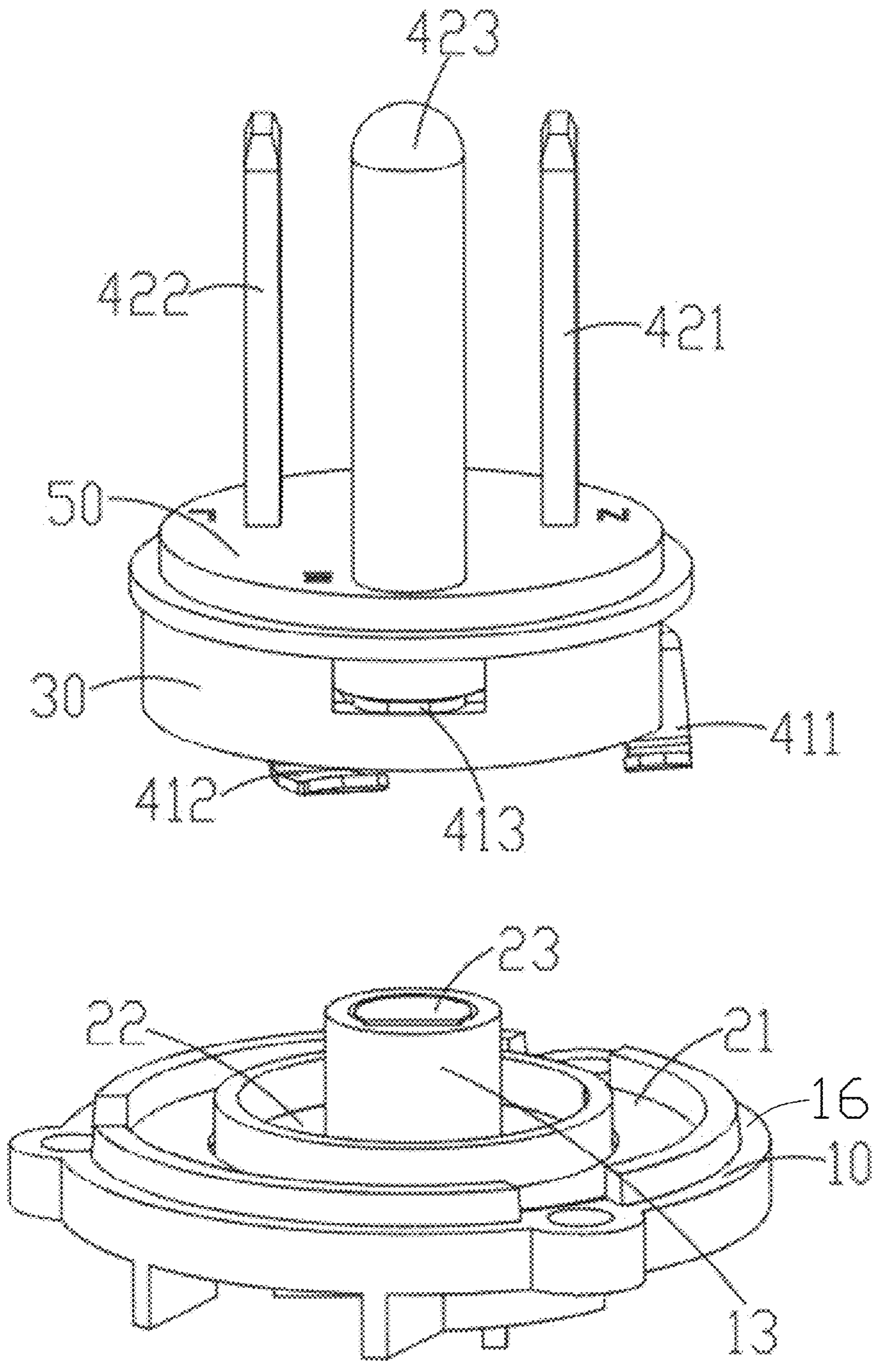
FIG. 5 shows a separate state of the non-rotating assembly and the rotating assembly of the present disclosure.

Referring to FIGS. 2 and 4, the rotating assembly 102 comprises a fastening element 30, a conductive unit 40 and a plate 50. The conductive unit 40 comprises a conductive unit 41 and a terminal unit 42 configured to electrically plug-in a power socket.

The fastening element 30 is configured for fixing the conductive unit 41 to the plate 50, the detailed structure will be described later.

The conductive unit 41 comprises a first rotating conductor 411 connected to the first ring-shaped conductor 21, a second rotating conductor 412 connected to the second ring-shaped conductor 22 and a third rotating conductor 413 connected to the non-rotating conductor 23, and each electrode terminal (described later) of the terminal unit 42 is connected to a corresponding one of the first ring-shaped conductor 21, the second ring-shaped conductor 22 and the non-rotating conductor 23 via a corresponding one of the rotating conductors. In this embodiment, the first rotating conductor 411 and the second rotating conductor 412 are made of copper.

Figure 6:
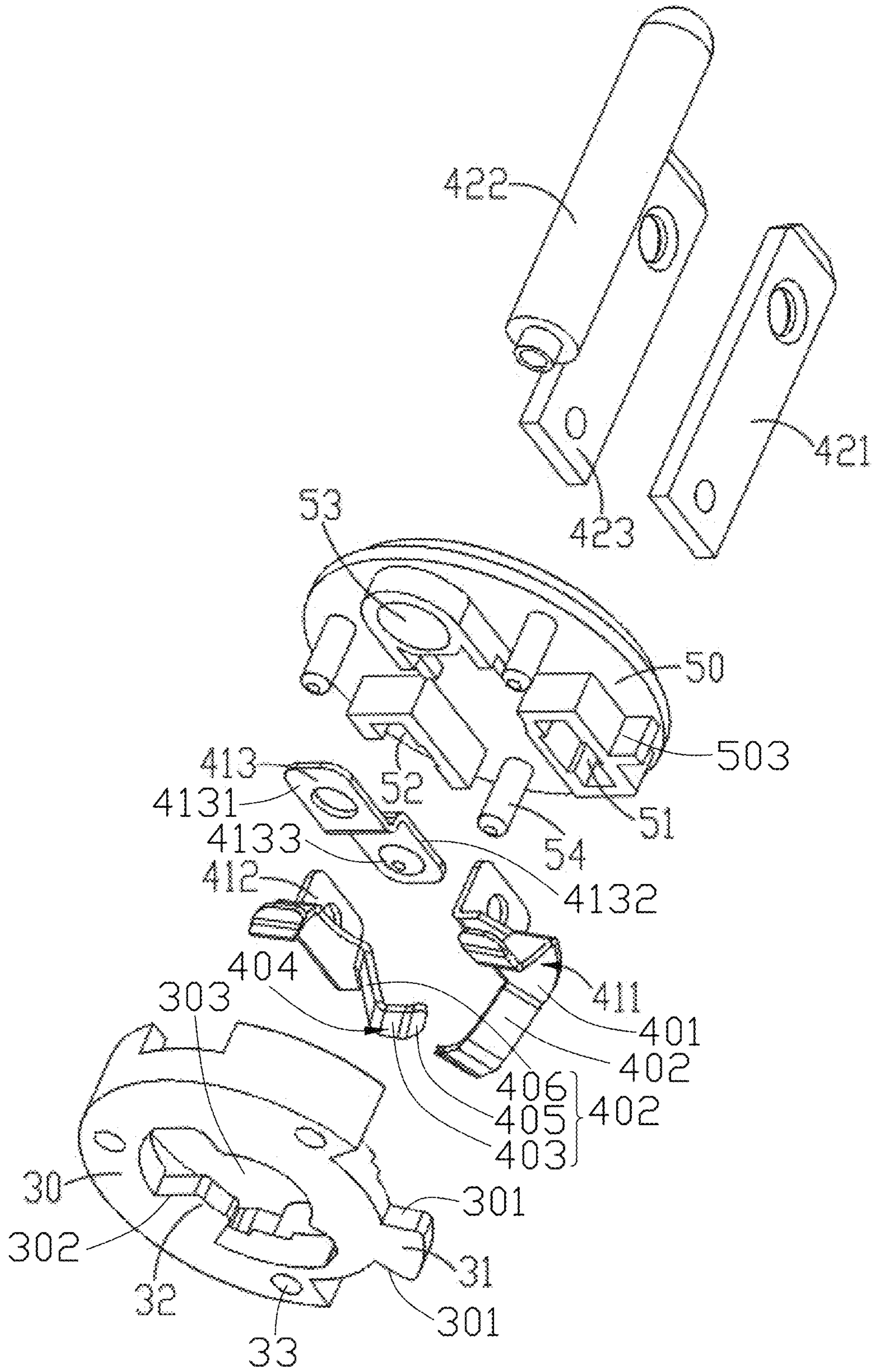
FIG. 6 is a second exploded view of the rotating assembly of the present disclosure.
Figure 7:
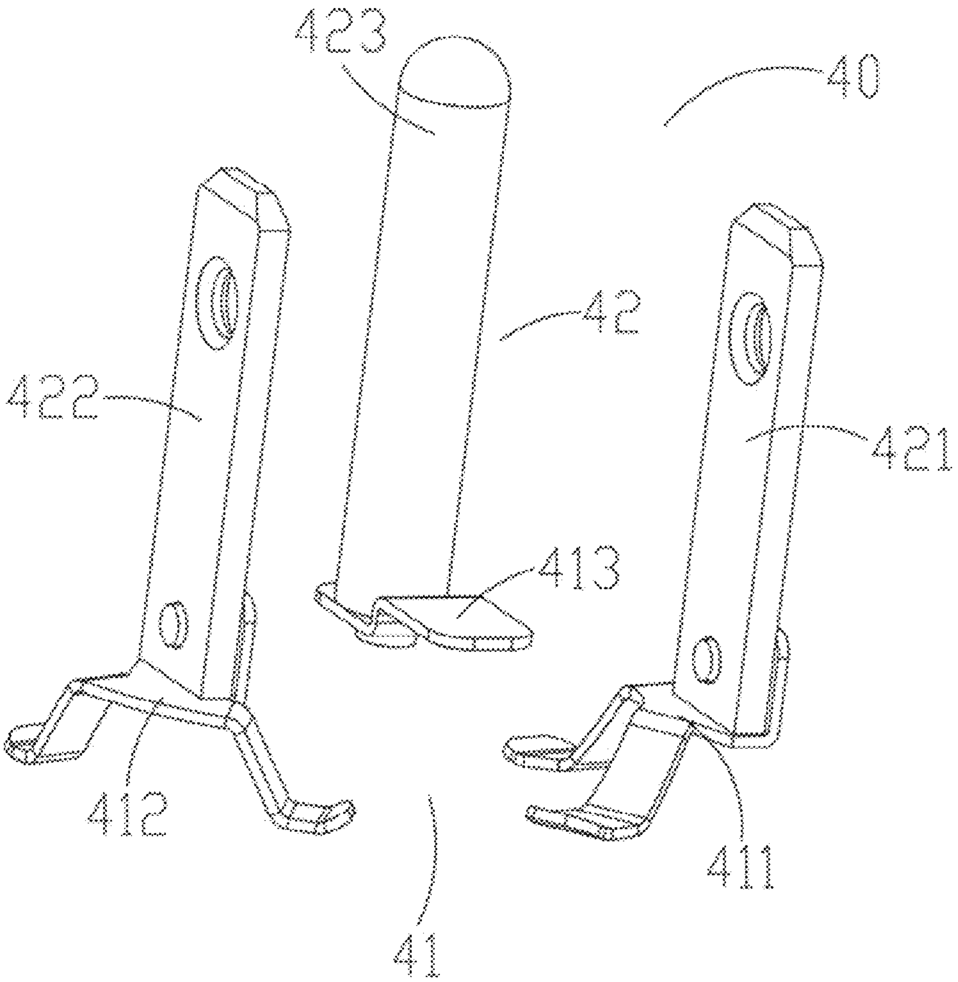
FIG. 7 is a schematic diagram of a conductive unit of the present disclosure.

Referring to FIGS. 4 and 6, at least one of the first rotating conductor 411 and the second rotating conductor 412 comprises a base 401 and two arms 402 extending from the base 401 and extending in two non-parallel directions.

Each arm 402 includes a contacting portion 403 having a contacting surface 404. The contacting surfaces 404 of the two arms 402 contact two different positions of the same ring-shaped conductor, so as to form two electronic contacting points. When one of the contacting portions is damaged caused by prolonged rotational friction, the rotating conduct still normally works due to existing another contacting point. Each of the contacting surface 404 is a flat surface. In the embodiment, an area of the flat surface is 2-5 square millimeters.

Each arm 402 further comprises an extending portion 405 adjacent to a free end of each of the two arms 402, the extending portion 405 connects to the contacting portion 403 and does not contact the corresponding one of the first ring-shaped conductor and the second ring-shaped conductor. Due to having the extending portion 405 that is not in contact with the corresponding one of the first ring-shaped conductor and the second ring-shaped conductor, therefore it can prevent the end of the arms 402 from tilting and deforming.

Each arm 402 further comprises a connecting portion 406 both obliquely connecting with the base 401 and the contacting portion 403, so that the base 401 and the contacting portion 403 are located on different planar surfaces.

In this embodiment, both the first rotating conductor 411 and the second rotating conductor 412 each comprises the base 401 and the two arms 402, the two arms 402 and at least part of the base 401 of the first rotating conductor 411 form a first arc-like structure, the two arms 402 and at least part of the base 401 of the second rotating conductor 412 form a second arc-like structure, and the second arc-like structure is closer to a center of the rotatable electrical plug 100 compared to the first arc-like structure. The base 401 of the first rotating conductor 411 and the base 401 of the second rotating conductor 412 are coplanar. In addition, both the first rotating conductor 411 and the second rotating conductor 412 each is a metal component with elasticity.

In other embodiment, the first rotating conductor 411 and the second rotating conductor 412 each comprises the base 401 and only one arm 402, which is not limit herein.

In addition, each of the first rotating conductor 411 and the second rotating conductor 412 further comprises a mounting portion 414 configured to connect to the corresponding one of the first electrode terminal 421 and the second electrode terminal 422. The mounting portion 414 is fixed on the corresponding one of the first electrode terminal 421 and the second electrode terminal 422 by a fastener 415, the fastener 415 can be a bolt, which is not limit herein.

A distance between the first rotating conductor 411 and the first ring-shape conductor 21, and a distance between the second rotating conductor 411 and the second ring-shape conductor 22 can be regulated due to its arm structure. That is, the size of the plug can be obtained by regulating these distances.

The third rotating conductor 413 is a slice, the slice comprises a first portion 4131 and a second portion 4132. The first portion 4131 is configured to connect to a third electrode terminal 423 (described later) of the terminal unit 42, and the second portion 4132 is closer to a center of the plate 50 compared to the first portion 4131. The first portion 4131 and the second portion 4132 are located on different planar surfaces. The third rotating conductor 413 further comprises a contact 4133 configured to connect to the non-rotating conductor 23 and arranged on the second portion 4132.

In this embodiment, the terminal unit 42 comprises a first electrode terminal 421, a second electrode terminal 422 and the third electrode terminal 423, the first electrode terminal 421, the second electrode terminal 422 and the third electrode terminal 423 are spaced from each other.

In this embodiment, the first electrode terminal 421, the second electrode terminal 422, and the third electrode terminal 423 are forms a set of pins of a three terminal plug, and the set of pins respectively corresponding to one of the live wire, zero wire, and ground wire.

The plate 50 is configured for fixing the terminal unit 42 and the conductive unit 41, the plate 50 comprises a first surface 501 exposed to an exterior of the rotatable electrical plug 100 and a second surface 502 disposed opposite to the first surface 501, one end of each of the electrode terminals extends through the plate 50, and exposes to the exterior from the second surface 502 of the plate 50, and then couples to a corresponding rotating conductor of the conductive unit 41.

The plate 50 comprises at least one aperture corresponding to the at least one of the electrode terminals, and a protrusion 503 located on the second surface 502 is applied to surround the corresponding aperture, the corresponding electrode terminal extends through the plate 50 via the corresponding aperture and one of the rotating conductors of the conductor unit 41 connected to the corresponding electrode terminal is arranged above the protrusion 503.

In this embodiment, referring to FIG. 6, the plate 50 comprises a first aperture 51 configured to receive first electrode terminal 421, a second aperture 52 configured to receive second electrode terminal 422, and a third aperture 53 configured to receive third electrode terminal 423.

The fastening element 30 is mounted on the rotating assembly 102. Specifically, the fastening element 30 is mounted on the second surface 502 of the plate 50, the fastening element 30 comprises notches corresponding to the arms 402 and a spacer formed between two adjacent notches arranged in a circumferential direction, the arms 402 expose outside via the corresponding notch, and the spacer 31 is disposed to sandwich the base 401 with the protrusion 503.

In this embodiment, referring to FIGS. 4 and 6, the fastening element 30 comprises two first notches 301 located an edge of the fastening element 30 and a first spacer 31 located between the two first notches 301, the first spacer 31 engaged on the base 401 of the first rotating conductor 411, and each of the two arms 402 of the first rotating conductor 411 is penetrated through the corresponding one of the two first notches 301.

The fastening element 30 further comprises two second notches 302 and a second spacer 32 located between the two second notches 302, the second spacer 32 engaged on the base 401 of the second rotating conductor 412, and each of the two arms 402 of the second rotating conductor 412 is penetrated through the corresponding one of the two second notches 302.

In this way, the fastening element 30 further fixes the first rotating conductor 411 and the second rotating conductor 412 on the plate 50, making the first rotating conductor 411 and the second rotating conductor 412 are not easily deformed, which can effectively improve the stability of the rotatable electrical plug 100 during use. In addition, the first spacer 31 and the second spacer 32 are arranged in a staggered manner. Specifically, the first spacer 31 and the second spacer 32 are configured to be asymmetric relative to a central axis of the fastening element 30.

In this embodiment, the first spacer 31 protrudes towards a direction away from a center of the fastening element 30, and the second spacer 32 protrudes towards the center of the fastening element 30.

Due to the staggered setting of the first spacer 31 and the second spacer 32, it can reduce the overall area and the volume of the rotatable electrical plug 100.

In addition, the fastening element 30 further comprises a hole 303 configured to make an allowance of the third rotating conductor 413 passing through. In this embodiment, the hole 303 is in air communication with the two second notches 302 and the hole 303 allows the cylinder 13 to pass through. In other embodiments, the hole 303 and the two second notches 302 can also be disconnected, and there is no limitation here.

By setting such the fastening element 30, the first rotating conductor 411 and the second rotating conductor 412 can be stably fixed, effectively preventing the first rotating conductor 411 and the second rotating conductor 412 from shifting and deforming during rotation, further avoiding electrical contact between the first rotating conductor 411 and the second rotating conductor 412, and effectively improving the safety of use.

In this embodiment, a height between the contacting portion 403 and the second surface 502 of the plate 50 is greater than a thickness of the fastening element 30, so that the contacting portion 403 exposes to an exterior via the corresponding notch and connects to the corresponding ring-shaped conductor.

The rotating assembly 102 further comprises a fixing structure configured to fix the fastening element 30 to the plate 50. In this embodiment, the fixing structure comprises a plurality of fixing holes 33 and a plurality of columns 54, the columns 54 are arranged and formed by parts of the plate 50, and the fixing holes 33 are defined and formed by parts of the fastening element 30, so that insert the columns 54 into the corresponding fixing hole 33 to secure the plate 50 and the fastening element 30. In other embodiments, other fixing structures can also be used, without limitation here.

Figure 9:
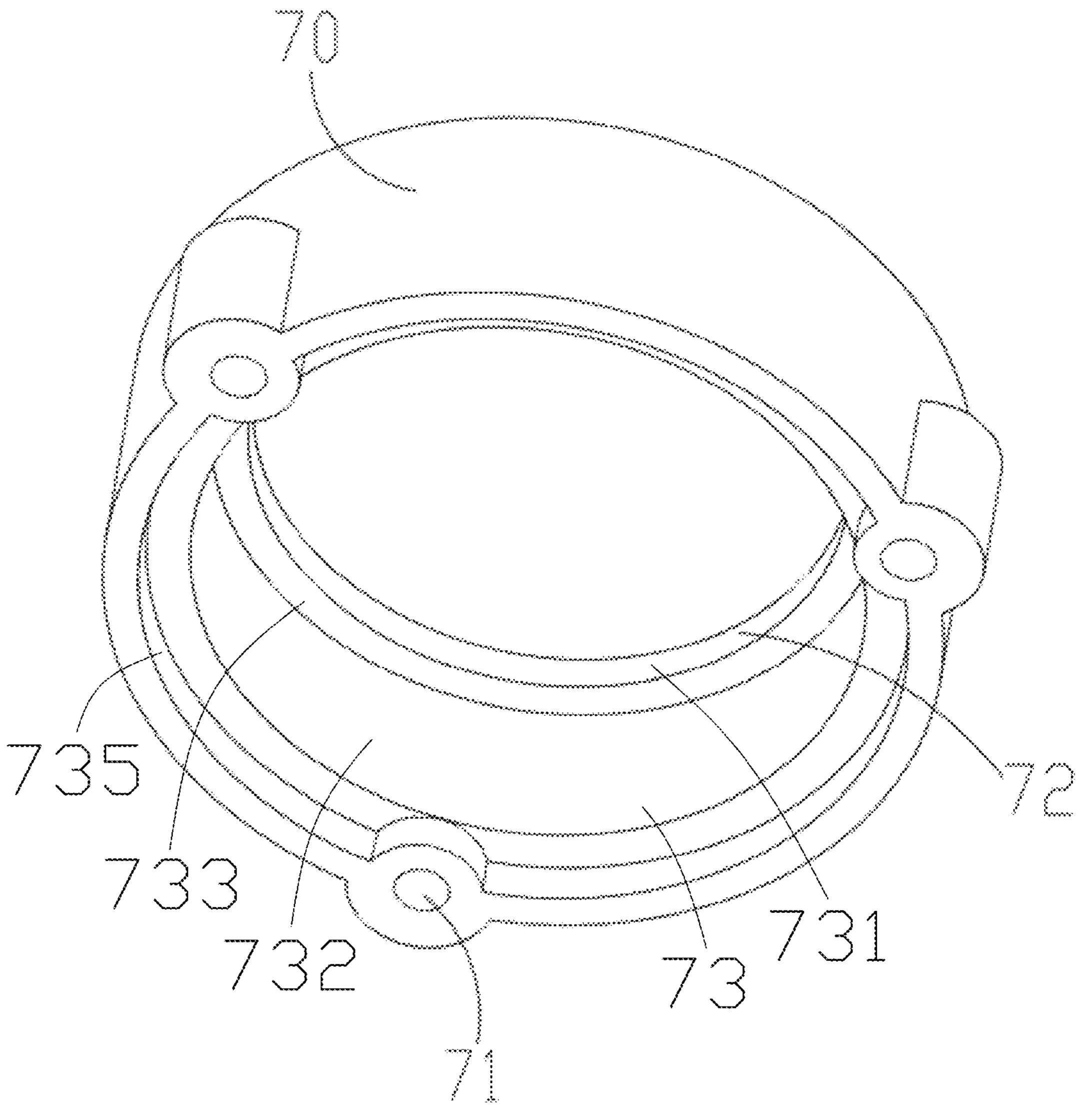
FIG. 9 is a schematic diagram of a frame of the present disclosure.
Figure 10:
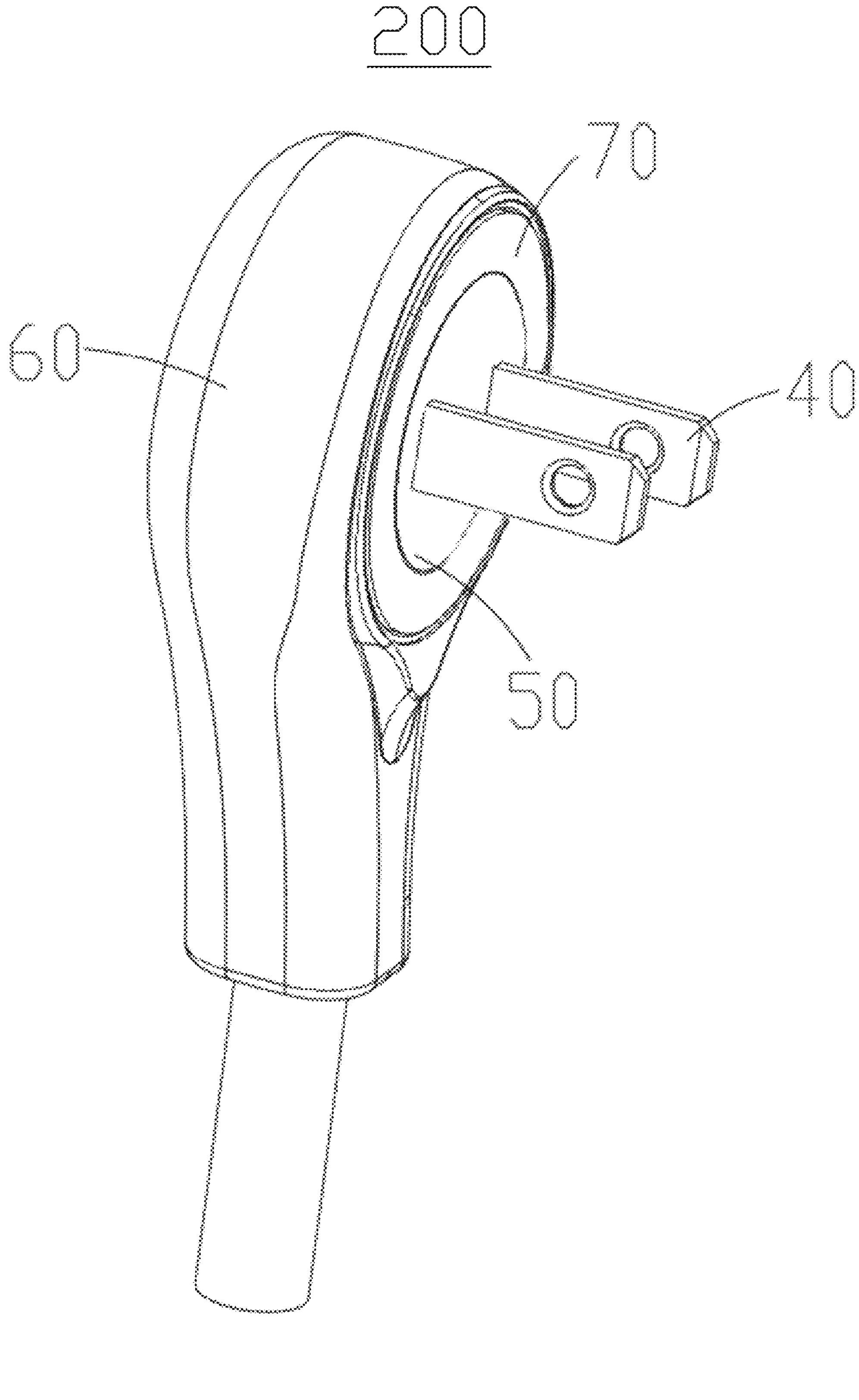
FIG. 10 is a schematic diagram of a second embodiment of a three-dimensional structure of a rotatable electrical plug according to the present disclosure.
Figure 11:
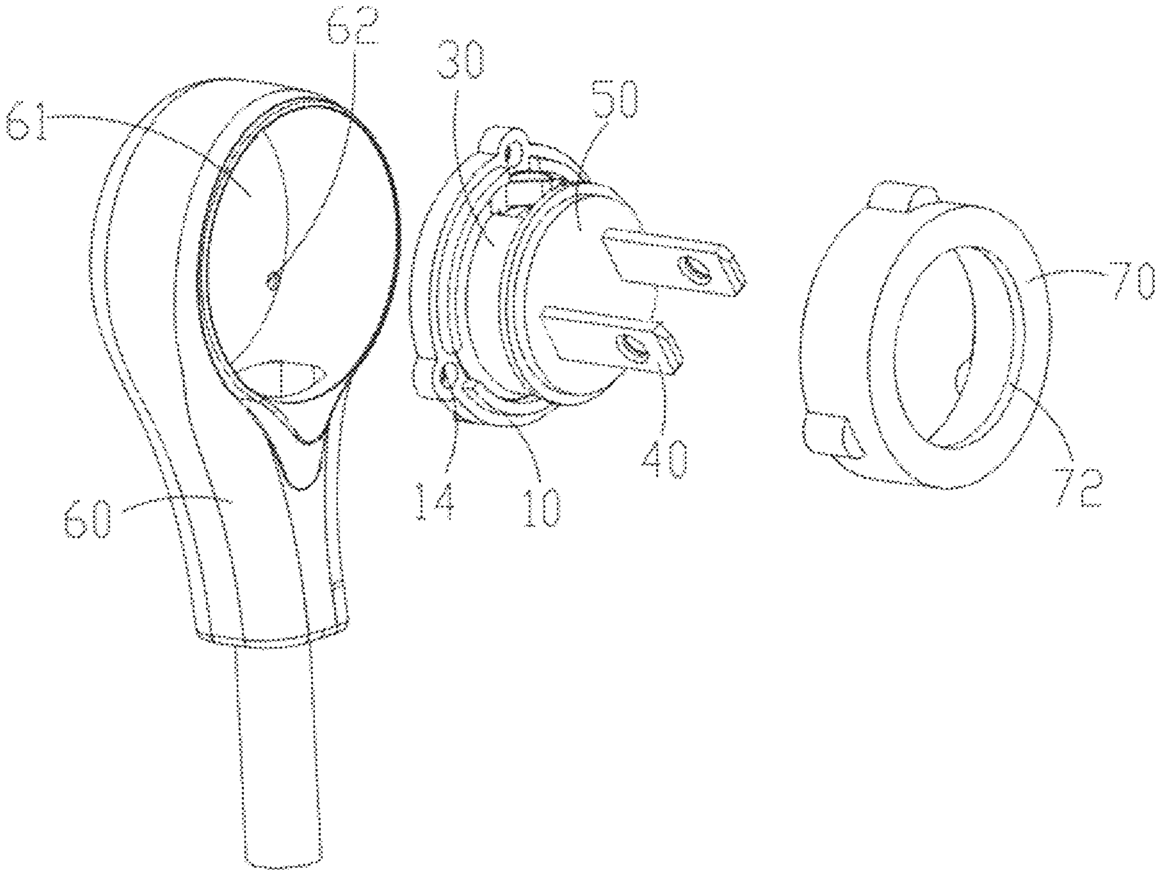
FIG. 11 is an exploded view of the rotatable electrical plug in the rotatable electrical plug shown in FIG. 10.
Figure 12:
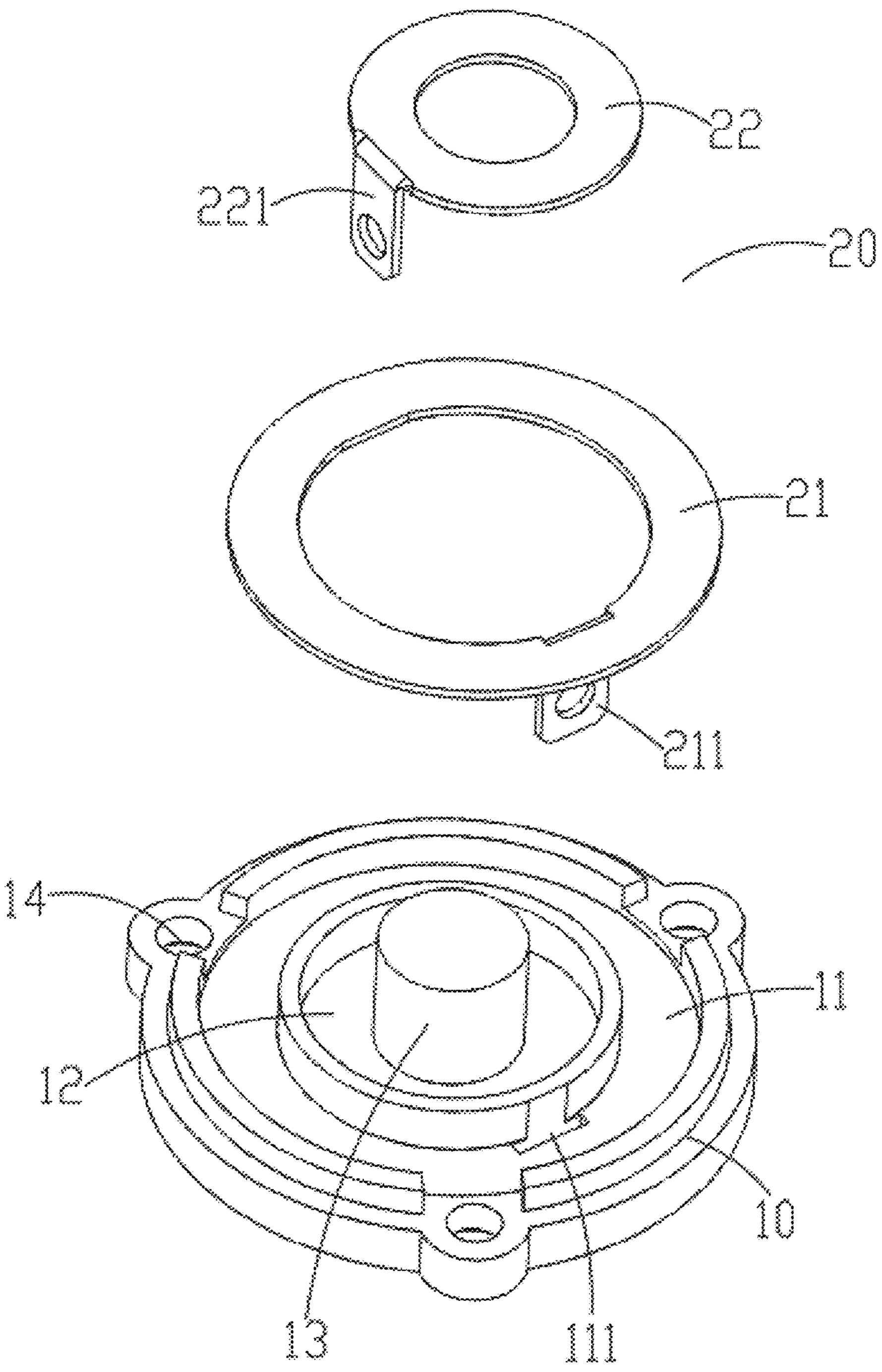
FIG. 12 is an exploded view of the non-rotating assembly in the rotatable electrical plug shown in FIG. 10.
Figure 13:
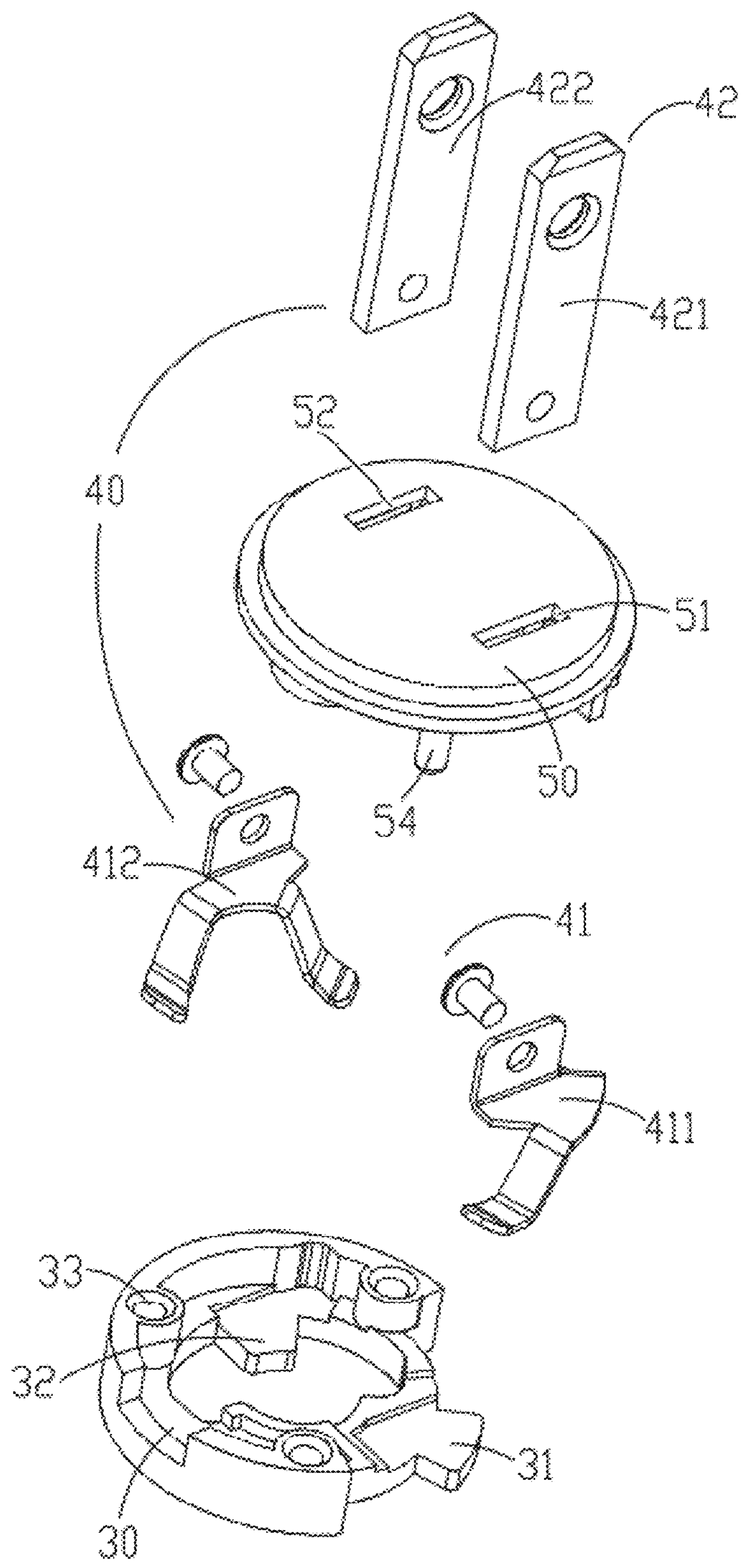
FIG. 13 is an exploded view of the rotating assembly of the second embodiment of the rotatable electrical plug shown in FIG. 10.

Referring to FIGS. 2 and 9, the frame 70 configured to fasten the non-rotating assembly 101 and pivotally fixed the rotating assembly 102 is shown. The frame 70 comprises an opening 72. The frame 70 comprises an inwall 73, which comprises a first end 731 and a second end 732. The first end 731 is equipped with a first convex portion 733, and a side surface of the plate 50 is equipped with a second convex portion 55.

In the assembly state, the rotating assembly 102 passes through the opening 72, and the second convex portion 55 is coupled with the first convex portion 733. The second end 732 defines a concave portion 735, the edge of the substrate 10 comprises a clamping portion 16, configured to be fixed in the concave portion 735. A bottom surface near the second end 732 of the frame 70 defines a plurality of fixed grooves 71, and the edge of the substrate 10 defines a plurality of first fixed holes 14.

Referring to FIG. 2, the housing 60 comprises a cavity 61 and a plurality of second fixed holes 62. The cavity 61 is configured to receive the non-rotating assembly 101, the rotating assembly 102, the conductive unit 41 and the frame 70.

In the assembly, the rotating assembly 102 engages on the first end 731 of the frame 70, and the non-rotating assembly 101 covers to the second end 732 of the frame 70, then placing the rotating assembly 102, the non-rotating assembly 101 and the frame 70 into the cavity 61 of the housing 60. Then, by threading several screws through the second fixed holes 62, the first fixed holes 14 and the fixed grooves 71, the rotating assembly 102 and the non-rotating assembly 101, the frame 70 and the housing 60 are connected and fixed, the electrode terminals are exposed to the frame 70 to insert into a socket.

Compared to the prior art, the rotatable electrical plug 100 of the present disclosure can be connected by setting the rotating conductors on the plate 50, the first ring-shaped conductor 21, the second ring-shaped conductor 22, and the non-rotating conductor 23 on the substrate 10, and connecting various components through the housing 60, the fastening element 30, and several screws, making the rotating assembly 102 able to rotate relative to the non-rotating assembly 101, so that it is convenient to use, the structure of the rotatable electrical plug 100 is simple, and the rotatable electrical plug 100 has good conductivity and durability.

Second Embodiment

FIGS. 10-13 illustrate a second embodiment of rotatable electrical plug 200. The design of the rotatable electrical plug 200 is very similar to the design of the rotatable electrical plug 100, the same reference numbers which were used in FIGS. 1-9 are used to identify like components in FIGS. 10-13 and only a brief description of the differences between the two rotatable electrical plugs is provided. The main difference is that the third rotating conductor 413, the non-rotating conductor 23 and the third electrode terminal 423 are not used in the rotatable electrical plug 200. In addition, the third groove 131 is not formed on the substrate 10, that is the cylinder 13 is formed on the center of the substrate 10.

Based on the above composition, it can achieve the same effect as the first embodiment mentioned above.

As can be appreciated from the above description, the design of the present rotatable electrical plug makes it possible to produce both two-prong and three-prong plugs without any substantial design changes. As a result, it is more economical to produce both two-prong and three-prong versions of the rotatable electrical plug.

Third Embodiment

Figure 14:
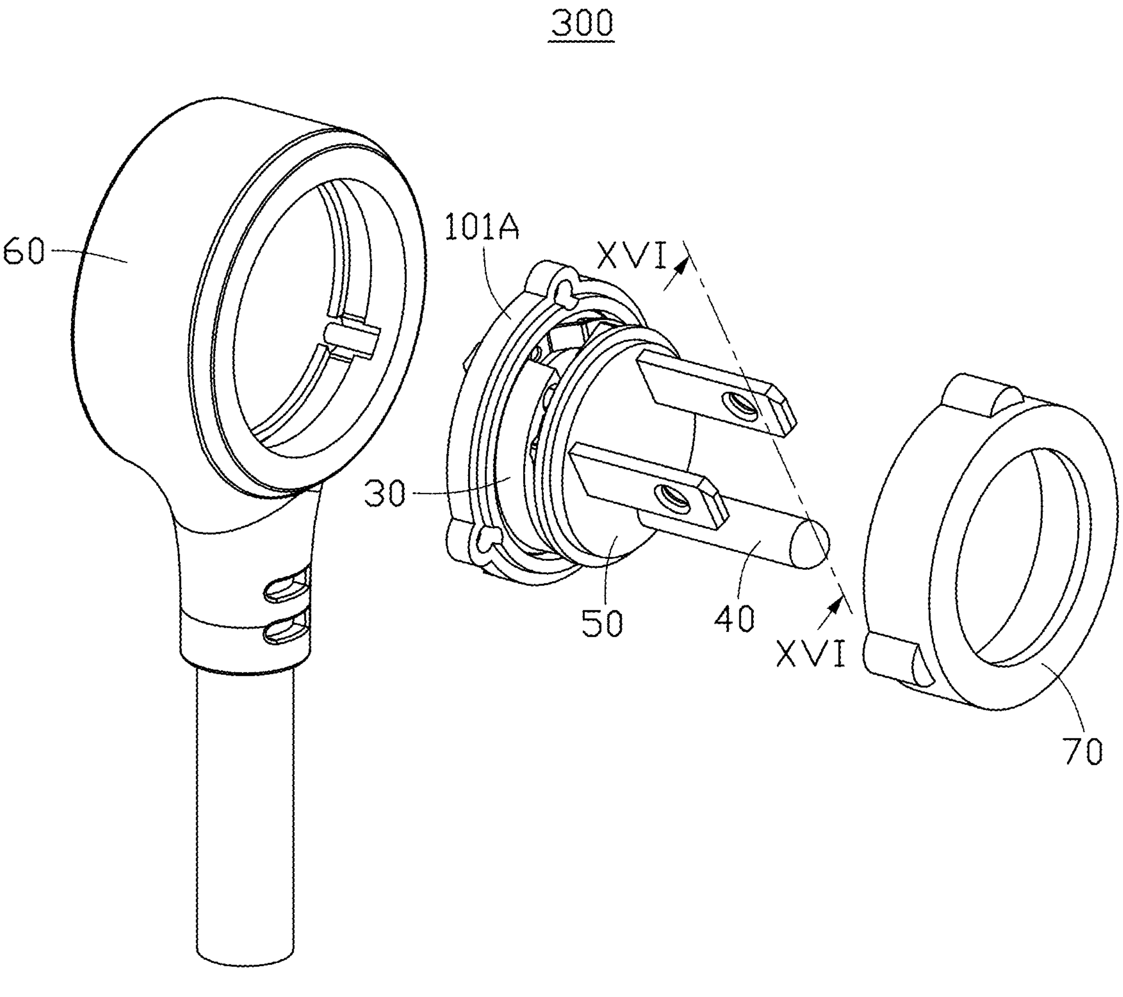
FIG. 14 is an exploded view of a third embodiment of the rotatable electrical plug.
Figure 15:
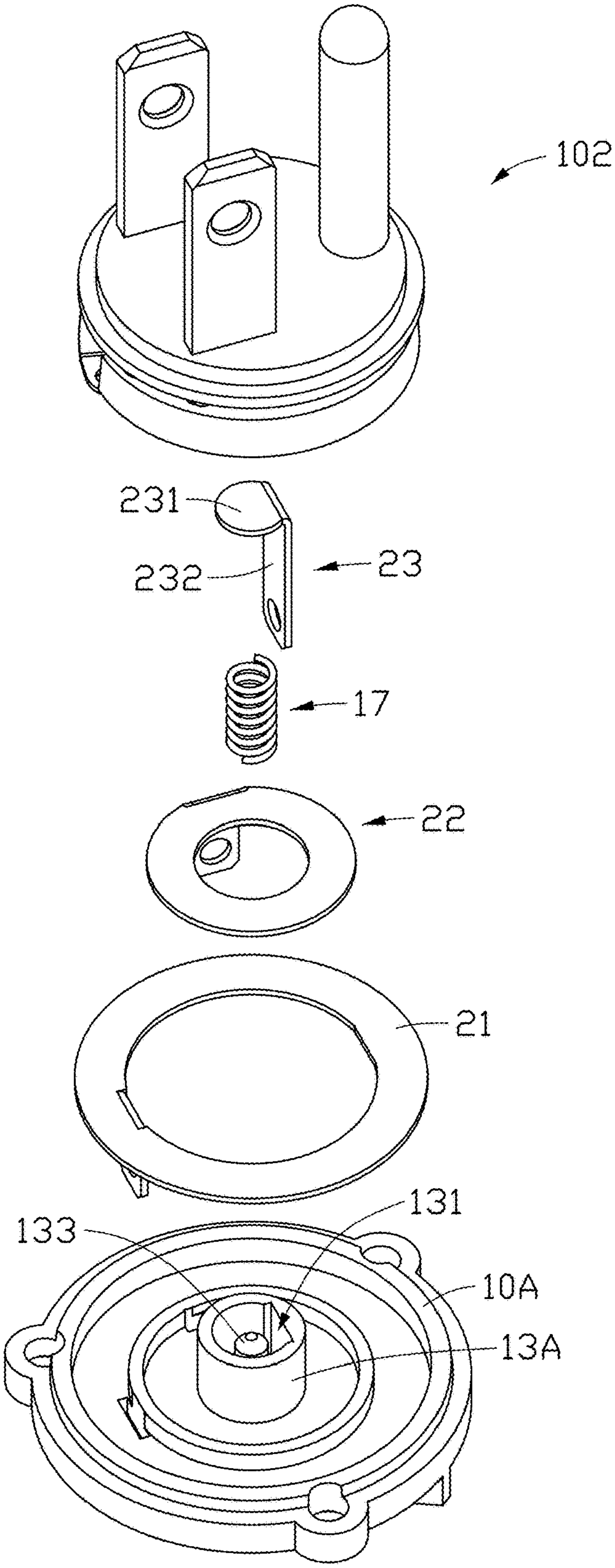
FIG. 15 is an exploded view of a non-rotating assembly and a rotating assembly of the rotatable electrical plug shown in FIG. 14.
Figure 16:
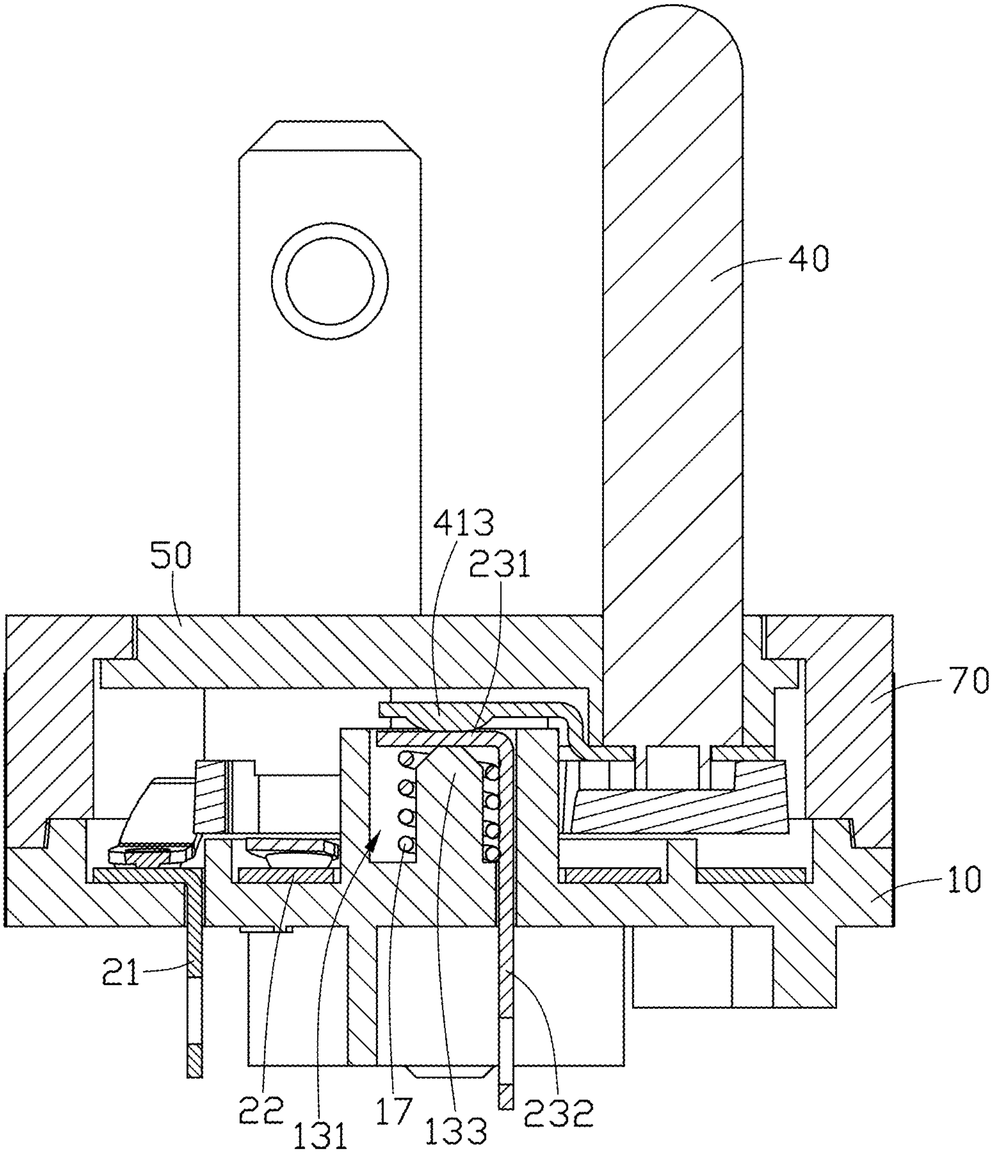
FIG. 16 is a sectional view of the non-rotating assembly and the rotating assembly along a line XVI-XVI of the rotatable electrical plug shown in FIG. 14.

FIGS. 14 to 16 illustrate a third embodiment of a rotatable electrical plug 300. For the convenience of explanation, the components with the same functions as those described in the above embodiments are labeled with the same reference numerals, and their explanations are omitted.

Referring to FIGS. 14 to 16, the difference between the rotatable electrical plug 300 of this embodiment and the rotatable electrical plug 100 of the first embodiment is that the structure of the non-rotating assembly 101A is different, and the other components are the same as those in the first embodiment and will not be repeated here.

In this embodiment, the non-rotating assembly 101A further comprises a fixed column 133 arranged in the third groove 131 and an elastic member 17 installed on the fixed column 133. The elastic member 17 is configured for abutting the sheet 231 of the non-rotating conductor 23 (shown in FIG. 4), so that the sheet 231 can tightly connect with the third rotating conductor 413 and improve the stability of the connection between the third rotating conductor 413 and the non-rotating conductor 23.

In this embodiment, the sheet 231 is roughly perpendicular to the third fixing portion 232, so that the elastic member 17 can better apply elasticity to the sheet 231, and then the sheet 231 can tightly connect with the third rotating conductor 413.

In this embodiment, the fixed column 133 can be for example a cylindrical column integrated with the substrate 10A, and the elastic member 17 can be for example a spring, the spring is sheathed on the cylindrical column.

Based on the above composition, it can achieve the same effect as the first embodiment mentioned above.

Fourth Embodiment

Figure 17:
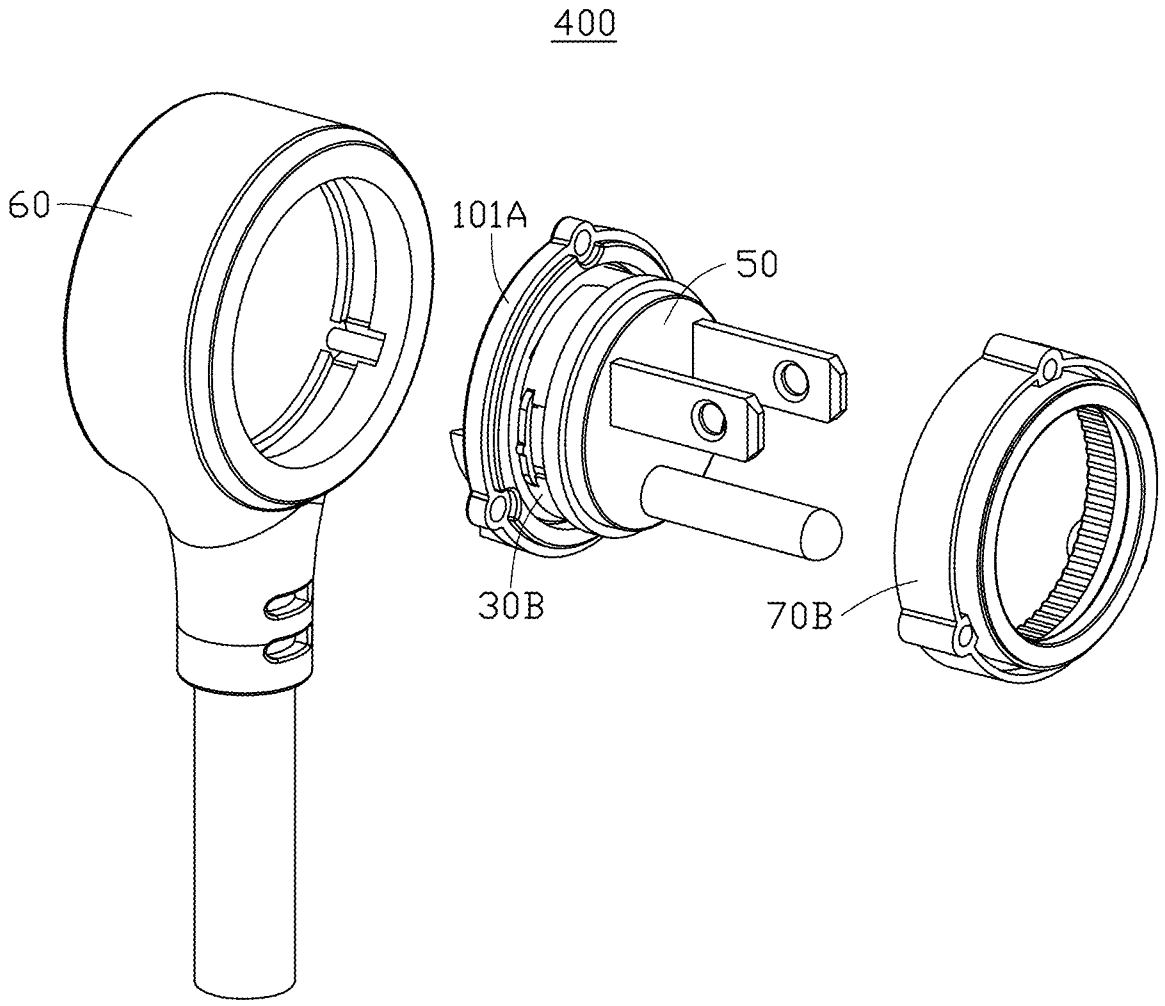
FIG. 17 is an exploded view of a fourth embodiment of the rotatable electrical plug.
Figure 18:
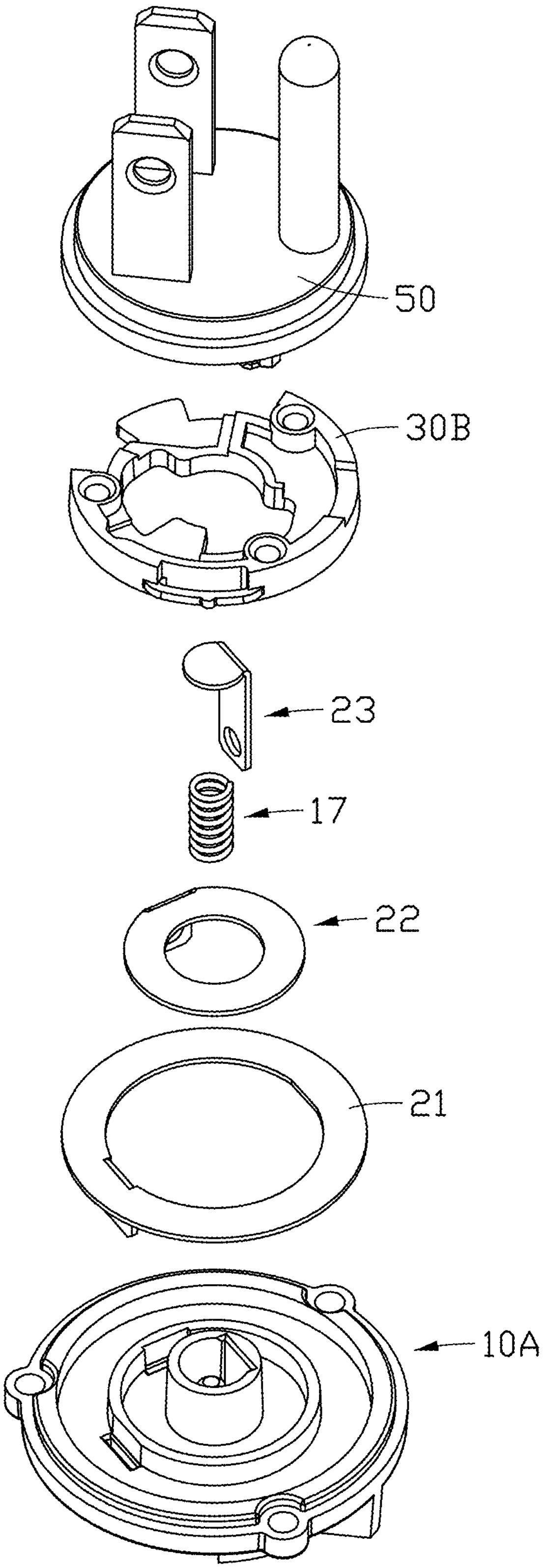
FIG. 18 is an exploded view of the non-rotating assembly and the rotating assembly of the rotatable electrical plug shown in FIG. 17.
Figure 19:
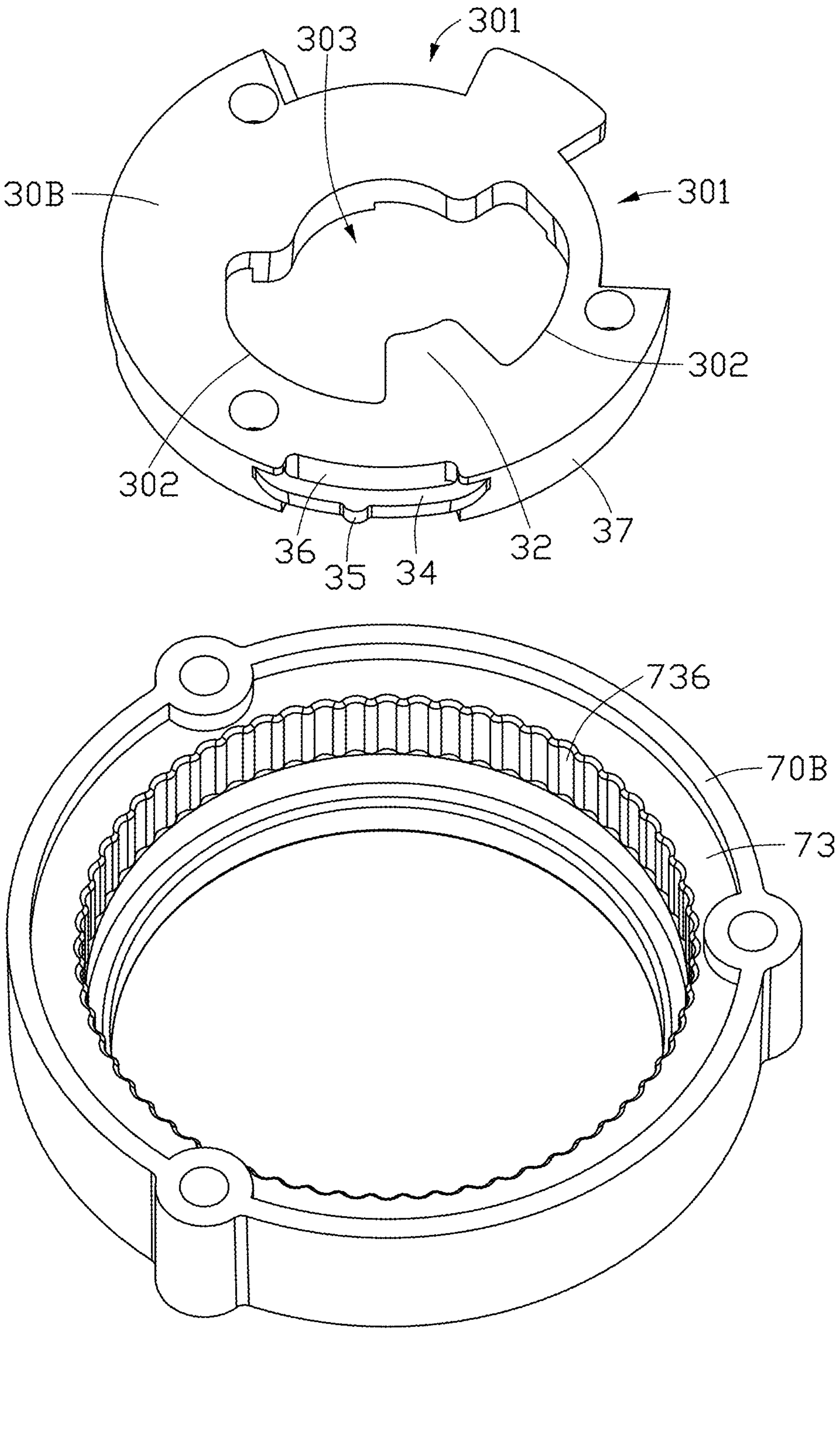
FIG. 19 is a schematic diagram of a fastening element and a frame of the rotatable electrical plug shown in FIG. 17.

FIGS. 17 to 19 illustrate a fourth embodiment of rotatable electrical plug 400. For the convenience of explanation, the components with the same functions as those described in the above embodiments are labeled with the same reference numerals, and their explanations are omitted.

Referring to FIGS. 17 to 19, the difference between the rotatable electrical plug 400 of this embodiment and the rotatable electrical plug 300 of the third embodiment is that the structure of the fastening element 30B and the structure of the frame 70B, and the other components are the same as those in the first embodiment and will not be repeated here.

In this embodiment, the fastening element 30B further comprises a side wall 34 extended along a circumferential direction of the fastening element 30B, an elastic portion 35 arranged on the side wall 34, and a rib 36 arranged on the elastic portion 35.

The elastic portion 35 extends along the circumferential direction of the fastening element 30B and both ends of the elastic portion 35 are connected to the fastening element 30B, and the other parts of the elastic portion 35 do not contact with the fastening element 30B, thereby making the elastic portion 35 having a certain elasticity.

In this embodiment, the rib 36 protrudes from a center of the elastic portion 35 and extends along a height direction of the elastic portion 35. In other embodiment, the rib 36 can be other structure, which is not limit herein.

In addition, in this embodiment, the fastening element 30B further comprises a recess 37 defined on the side wall 34 of the fastening element 30B corresponding to the elastic portion 35, so as to provide a sufficient space for the deformation of the elastic portion 35 when the rotating assembly 102 rotates relative to non-rotating assembly 101.

The frame 70B further comprises an inner wall 736 facing towards the side wall 34 of the fastening element 30B, and a plurality of recessed portions 737 defined on the inner wall 736. The plurality of recessed portions 737 are arranged along a circumferential direction of the inner wall 736 and each extends along a height direction of the frame 70B. The rib 36 is configured to be insertable into the corresponding one of the recessed portions 737 during rotation.

Due to the rib 36 always being inserted into one of the plurality of recessed portions 737, so that the position of the rotating assembly 102 relative to the non-rotating assembly 101 is fixed without applying force, and it is not easy for the rotating assembly 102 to rotate relative to the non-rotating assembly 101 during use, and therefore making the rotating feel better and improving the user experience.

In this embodiment, the plurality of recessed portions 737 are continuously defined on the inner wall 736, each of the plurality of recessed portions 737 comprises a first end 738 and a second end 739, an angle $\alpha$ defined by a line connecting the first end 738 and a center O of the frame 70B and a line connecting the second end 739 and the center O of the frame 70B ranges from about 3° to 6°.

In other embodiment, the plurality of recessed portions 737 are distributed at intervals, and when the rotating assembly 102 rotates to a specific position relative to the non-rotating assembly 101, the rib 37 can insert into the corresponding one of the plurality of recessed portions 737, so that the position of the rotating assembly 102 relative to the non-rotating assembly 101 is fixed without applying force.

In this embodiment, a cross-sectional shape of the plurality of recessed portions 737 can be for example a circular arc shape, and the rib 37 has a circular arc shape that matches the plurality of recessed portions 737. In this way, the plurality of recessed portions 737 can serve as guide grooves, guiding the rib 37 to be inserted into the corresponding one of the plurality of recessed portions 737.

In other embodiment, the cross-sectional shape of the plurality of recessed portions 737 can be for example a triangle or other shape, which is not limit herein.

In addition, a depth and a width of the plurality of recessed portions 737, as well as a height and a width of the rib 37 can be adjusted appropriately according to the needs, which is not limit herein.

Based on the above composition, it can achieve the same effect as the first embodiment mentioned above.

What is claimed is:

1. A rotatable electrical plug comprising:

a non-rotating assembly configured for receiving and being coupled with power lines of the rotatable electrical plug, the non-rotating assembly comprising a substrate and at least one non-rotating element;

a rotating assembly being rotatable relative to the non-rotating assembly, the rotating assembly comprising at least two electrode terminals configured to electrically plug-in a power socket; and at least one rotating conductor connected to the at least one non-rotating element respectively, the at least one rotating conductor comprising a base and at least one arm obliquely extending from the base; and a fastening element mounted on the rotating assembly and configured for fixing the at least one rotating conductor, the fastening element comprising a first notch opened in a side wall of the fastening member, wherein the at least one arm passes through the first notch to expose outside of the fastening member.

2. The rotatable electrical plug according to claim 1, wherein the at least one non-rotating element comprises a first ring-shaped conductor and a second ring-shaped conductor spaced from the first ring-shaped conductor, the at least one rotating conductor comprises a first rotating conductor and a second rotating conductor connected to the first ring-shaped conductor and the second ring-shaped conductor respectively, each of the first rotating conductor and the second rotating conductor comprises a base and at least one arm extending from the base, the fastening element comprises a first space adjacent to the first notch, a second notch opened in the side wall of the fastening member and a second spacer adjacent to the second notch, and the first spacer and the second spacer are arranged in a staggered manner.

3. The rotatable electrical plug according to claim 2, wherein the first spacer protrudes towards a direction away from a center of the fastening element, the second spacer protrudes towards the center of the fastening element.

4. The rotatable electrical plug according to claim 2, wherein the non-rotating assembly further comprises a non-rotating conductor arranged on the substrate and an elastic member, the first ring-shaped conductor, the second ring-shaped conductor and the non-rotating conductor are sequentially arranged at intervals, and the non-rotating conductor is surrounded by the second ring-shaped conductor, the at least one rotating conductor further comprises a third rotating conductor electrically connected to the non-rotating conductor, the substrate comprises a groove configured for receiving the non-rotating conductor, the non-rotating conductor comprises a sheet contacted with the third rotating conductor and a fixing portion integrated with the sheet, one end of the fixing portion extends through the substrate and is fixed on the substrate, and the elastic member is arranged in the groove and is configured for abutting the sheet of the non-rotating conductor.

5. The rotatable electrical plug according to claim 4, wherein the non-rotating assembly further comprises a fixed column arranged in the groove, and the elastic member is arranged on the fixed column.

6. The rotatable electrical plug according to claim 4, wherein the substrate further comprises a cylinder, and the groove is defined on the cylinder, and the fastening element comprises a hole in air communication with the second notch, and the hole allowing the cylinder to pass through.

7. The rotatable electrical plug according to claim 1, wherein the rotatable electrical plug further comprises a frame configured for fastening the non-rotating assembly and pivotally fixing the rotating assembly, the frame comprises an inner wall facing towards the side wall of the fastening element, and a plurality of recessed portions defined on the inwall of the frame, the plurality of recessed portions are arranged along a circumferential direction of the inner wall and each extends along a height direction of the frame, the fastening element further comprises a rib arranged on the side wall and configured to be inserted into the corresponding one of the plurality of recessed portions during rotation.

8. The rotatable electrical plug according to claim 7, wherein the fastening element further comprises an elastic portion arranged on the side wall of the fastening element and extended along a circumferential direction of the fastening element, both ends of the elastic portion are connected to the fastening element, and the rib is arranged on the elastic portion.

9. The rotatable electrical plug according to claim 8, wherein the fastening element defines a recess on the side wall corresponding to the elastic portion, so as to provide a sufficient space for the deformation of the elastic portion when the rotating assembly rotates relative to non-rotating assembly.

10. The rotatable electrical plug according to claim 7, wherein each of the plurality of recessed portions comprises a first end and a second end, an angle defined by a line connecting the first end and a center of the frame and a line connecting the second end and the center of the frame ranges from 3° to 6°.

11. A rotatable electrical plug comprising:

a non-rotating assembly configured for receiving and being coupled with power lines of the rotatable electrical plug, the non-rotating assembly comprising:

a substrate and at least one non-rotating element;

a rotating assembly rotatably moving relative to the non-rotating assembly, the rotating assembly comprising:

at least two electrode terminals configured to electrically plug-in a power socket; and at least one rotating conductor connected to the at least one non-rotating element respectively, the at least one rotating conductor comprising a base and at least one arm obliquely extending from the base;

a frame configured for fastening the non-rotating assembly and pivotally fixing the rotating assembly, and comprising an inner wall and a plurality of recessed portions defined on the inwall of the frame, the plurality of recessed portions arranged along a circumferential direction of the inner wall and extended along a height direction of the frame; and a fastening element mounted on the rotating assembly and comprising a side wall facing towards the inner wall of the frame, and a rib arranged on the side wall and configured to be insertable into the corresponding one of the plurality of recessed portions during rotation.

12. The rotatable electrical plug according to claim 11, wherein the fastening element further comprises an elastic portion arranged on the side wall of the fastening element and extended along a circumferential direction of the fastening element, both ends of the elastic portion are connected to the fastening element, and the rib is arranged on the elastic portion.

13. The rotatable electrical plug according to claim 12, wherein the fastening element defines a recess on the side wall corresponding to the elastic portion, so as to provide a sufficient space for the deformation of the elastic portion when the rotating assembly rotates relative to non-rotating assembly.

14. The rotatable electrical plug according to claim 11, wherein each of the plurality of recessed portions comprises a first end and a second end, an angle defined by a line connecting the first end and a center of the frame and a line connecting the second end and the center of the frame ranges from 3° to 6°.

* * * * *